SELECTIVE FILLING MECHANISM FOR SHUTTLELESS LOOMS

Filed June 1, 1965 11 Sheets-Sheet 1

INVENTORS
THEODORE S. HIGGINS
WESLEY L. TINKHAM
BY Albert A. Mahassel
ATTORNEY

INVENTOR.
THEODORE S. HIGGINS
WESLEY L. TINKHAM
BY Albert A. Mahassel
ATTORNEY

INVENTORS
THEODORE S. HIGGINS
WESLEY L. TINKHAM
BY
Albert A. Mahassel
ATTORNEY

INVENTOR.
THEODORE S. HIGGINS
WESLEY L. TINKHAM
BY Albert A. Mahassel
ATTORNEY

SELECTIVE FILLING MECHANISM FOR SHUTTLELESS LOOMS

INVENTOR.
THEODORE S. HIGGINS
WESLEY L. TINKHAM
BY
Albert A. Mahassel
ATTORNEY

SELECTIVE FILLING MECHANISM FOR SHUTTLELESS LOOMS

Filed June 1, 1965 11 Sheets-Sheet 6

INVENTORS
THEODORE S. HIGGINS
WESLEY L. TINKHAM
BY
Albert R. Mahassel
ATTORNEY

INVENTOR.
THEODORE S. HIGGINS
WESLEY L. TINKHAM
BY Albert A. Mahassel
ATTORNEY

SELECTIVE FILLING MECHANISM FOR SHUTTLELESS LOOMS

Filed June 1, 1965 11 Sheets-Sheet 8

INVENTOR.
THEODORE S. HIGGINS
WESLEY L. TINKHAM
BY Albert A. Mahassel
ATTORNEY

INVENTOR.
THEODORE S. HIGGINS
WESLEY L. TINKHAM
BY Albert A. Mahassel
ATTORNEY

June 6, 1967 T. S. HIGGINS ET AL 3,323,556

SELECTIVE FILLING MECHANISM FOR SHUTTLELESS LOOMS

Filed June 1, 1965 11 Sheets-Sheet 10

INVENTOR.
THEODORE S. HIGGINS
WESLEY L. TINKHAM
BY
Albert R. Mahassel
ATTORNEY

June 6, 1967 T. S. HIGGINS ET AL 3,323,556

SELECTIVE FILLING MECHANISM FOR SHUTTLELESS LOOMS

Filed June 1, 1965 11 Sheets-Sheet 11

INVENTORS
THEODORE S. HIGGINS
WESLEY L. TINKHAM
BY
Albert A. Mahassel
ATTORNEY

United States Patent Office 3,323,556
Patented June 6, 1967

3,323,556

SELECTIVE FILLING MECHANISM FOR SHUTTLELESS LOOMS

Theodore S. Higgins, Woonsocket, R.I., and Wesley L. Tinkham, Upton, Mass., assignors to Draper Corporation, Hopedale, Mass., a corporation of Maine
Filed June 1, 1965, Ser. No. 460,380
19 Claims. (Cl. 139—122)

The present invention pertains to filling motions for shuttleless looms of the type adapted to introduce filling from an outside source into the warp sheds by reciprocating flexible yarn carrying members. The invention refers more particularly to a novel filling motion for supplying a plurality of filling yarns of varying colors or types for insertion into individual warp sheds according to a predetermined design.

It is a general object of the invention to provide a filling selecting motion in a shuttleless type loom for presenting any one of a plurality of filling yarns to the yarn carrier.

It is a further object of the invention to provide a filling selecting motion whereby the controlled oscillation of the yarn presenting mechanism will position a chosen yarn for insertion to the warp shed.

It is a further object to providing a filling selecting motion in which a plurality of filling yarns may be individually placed into a position for insertion to a warp shed for varying time intervals.

It is a still further object of the invention to provide in a unitary subassembly a plurality of sets of yarn cutting and clamping means which is rotatable so that each set may be selectively positioned in a predetermined pattern sequence.

It is a further object to provide a filling control mechanism for a plurality of filling yarns by which a selected yarn is positioned, a measured length cut, and then drawn under tension into the warp shed.

These and other objects of the invention will become apparent as further details are disclosed.

In shuttleless looms of the type described, filling from large packages, fixedly located outside the inserting means of the loom, is placed in a position to be picked up by yarn carriers reciprocating upon flexible tapes in and out of the warp sheds. Looms for weaving in this manner with filling control means for presenting a single end of filling for insertion are generally disclosed in United States Patent No. 2,654,399. As is well known in the weaving art, such a filling control means generally positions and measures pairs of filling picks following their withdrawal from a continuous source of supply. The filling is introduced in a warp shed as a doubled length of warn by an inserting carrier and there transferred to a filling extending carrier which draws the free end of filling the remaining distance through the shed. After a new warp shed has been formed the second pick of the pair is likewise inserted and drawn completely through the shed. The formation of each two picks is similar to a hairpin where each leg thereof lies in a separate warp shed with the connecting loop being positioned in the selvage on the filling inserting side of the loom.

Filling control mechanisms for effecting this type of filling insertion may be placed on both sides of a loom or, as is the more common practice, only on one side. The mechanism requires in this instance certain clamping or binding devices, a cutter operated with one of the binding means, and filling guiding and depressing means, the latter being employed for deflecting the filling into the pathway of the inserting carrier. This mechanism has been suitable for looms weaving a single type of filling as, for example, one weight or one color of yarn.

It is often desirable to mix fillings by alternately selecting a particular one out of several available choices and subsequently selecting a second, etc. Until now it has not been practicable to mix fillings in this way because of space and time limitations. The space allowable for mechanism to accomplish this purpose is restricted to the forward and backward movement of the lay and the fact that the insertion of the carrier can take place only at a narrowly restricted point in that movement. Also the time available for positioning the mechanism so that a particular color of yarn is in place for insertion is only a fraction of the time required for a single pick which may be occurring between three and five times each second.

The invention to be described herein includes a plurality of yarn paths through a filling control mechanism wherein each yarn path comprises a complete set of yarn clamping, positioning, binding and cutting devices for controlling a separate filling yarn. Each set of these devices is adapted to be individually positioned so as to present its particular yarn to the inserting carrier when so chosen by any suitable patterning means. The filling control mechanism, by oscillating through an arc, positions the chosen yarn to coincide with the movement of the inserting elements.

The invention will be described by reference to a specific embodiment thereof as illustrated in the accompanying figures of drawing wherein:

FIG. 9 is an enlarged detail of one cutter and gripper portion shown in FIG. 7;

Figure 1:
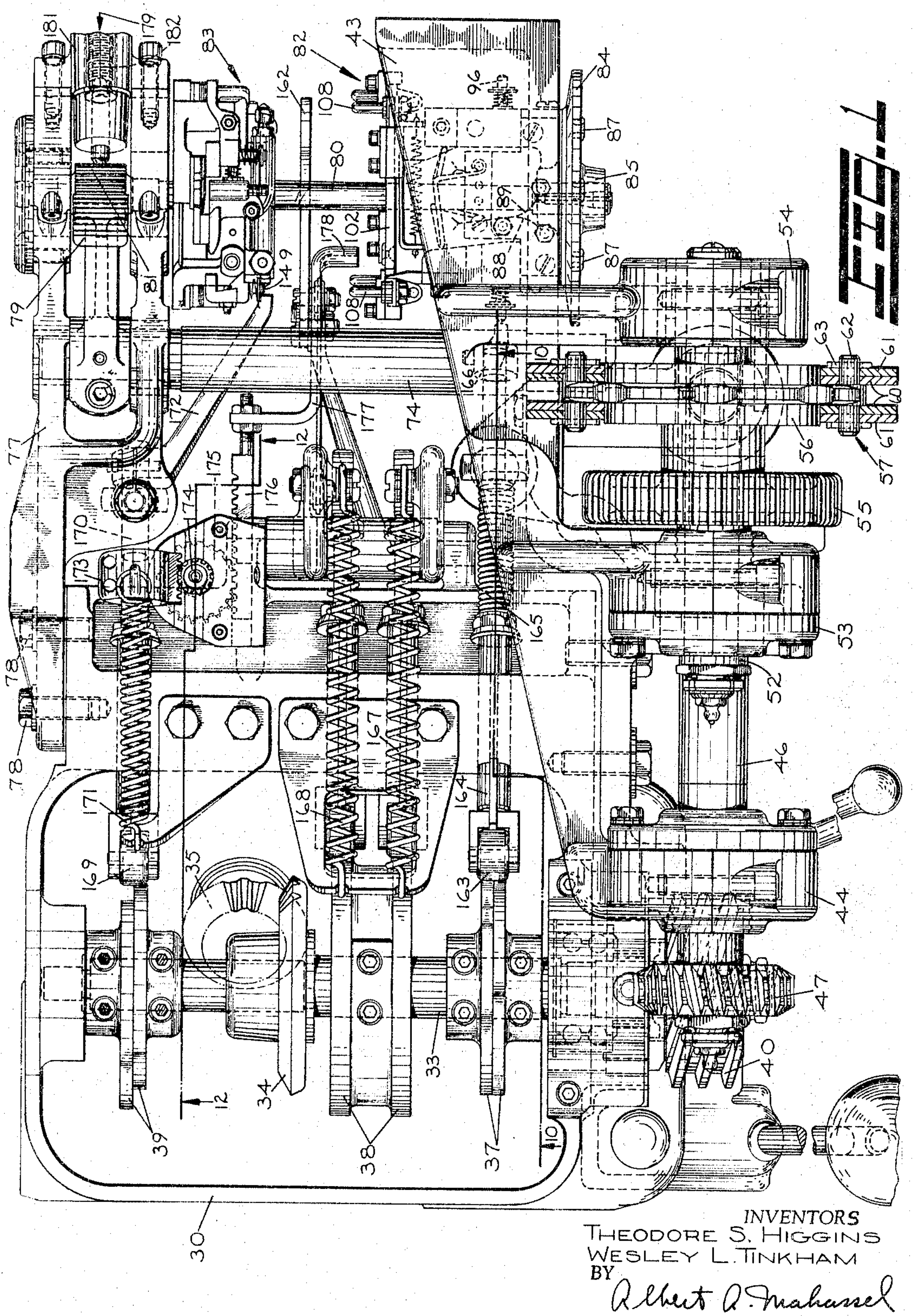
FIG. 1 is a plan view of a shuttleless loom filling control with a selective filling mechanism.
Figure 2:
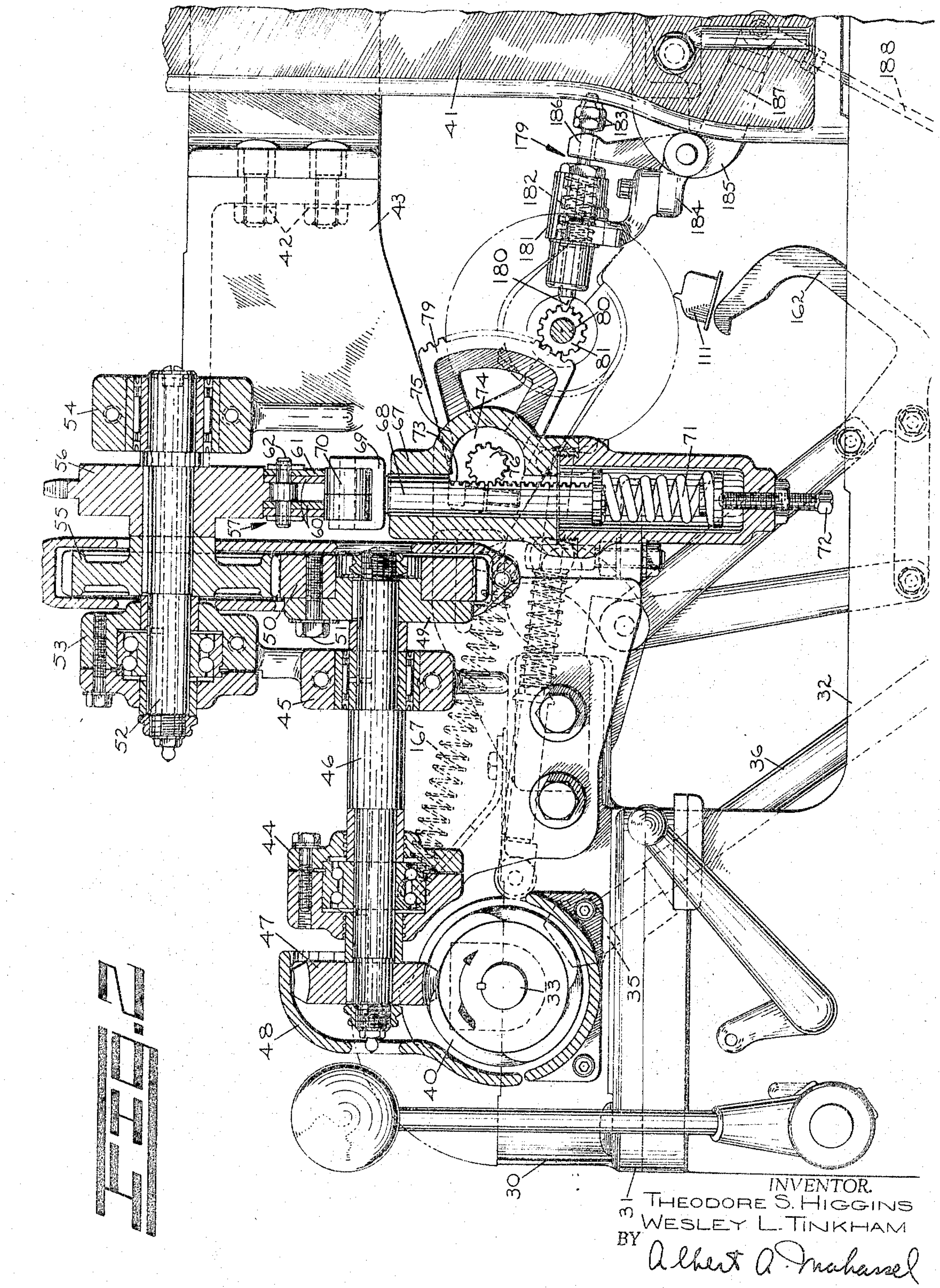
FIG. 2 is an elevation, shown partially in section, of the device shown in FIG. 1 as viewed from the right-hand side of the loom.

Now referring to FIGS. 1 and 2, the invention is shown attached to the forward right-hand corner of a shuttleless loom of the type described. It will be understood that the mechanism might also be applied to the left-hand side or also upon both sides by reversing the right- and left-hand lineal controlling parts. As was explained in the above cited U.S. patent, various schemes for filling insertion could be carried out by making changes in the timing devices to allow filling to be inserted from opposing sides, but in the instant preferred embodiment a single mechanism attached to the right-hand side will be explained. Basically the parts and operation of the timing and actuation portion of the invention are similar to and are thoroughly explained in the above patent. Explanation will be made of the operation of only those parts which are directly necessary to the function of the novel filling selective mechanism. A casing member 30 is bolted to and supported by the breast beam 31 which extends between loomsides 32 (only one shown) in the usual manner. The casing 30 contains the rotating driving means to be briefly explained and may enclosed a lubricating fluid and should also have a cover (not shown).

A shaft 33 is supported for rotation in bearings held in the opposing sides of the casing 30 and has a driven bevel gear 34 keyed thereto. A second bevel gear 35 in mesh with the gear 34 is fixed to rotate with a downwardly extending shaft 36 (FIG. 2) which has suitable gearing at the lower end to be driven by the loom's main cam shaft (not shown). In the present instance the shafts will rotate at a two to one ratio, with shaft 33 making a complete revolution for each two picks. There pairs of radial type cams 37, 38, and 39 are adjustably fixed to the shaft 33 in spaced apart relationship. The function of these cams is explained in full in the above U.S. patent and will be reviewed at appropriate points in this disclosure.

The shaft 33 extends through the casing 30 toward the right-hand side of the loom with a worm gear 40 keyed at the outward end (FIGS. 1 and 2). An upright harness sheave bracket 41, of the loom framework, holds by bolts 42 a drive shaft bracket 43 which extends forwardly of the loom to a point generally above the outward end of the shaft 33. Two bearings 44 and 45 depend from the bracket 43 and support for rotation a shaft 46. A worm gear 47 is keyed to the forward end of the shaft 46 and meshed with the worm gear 40 to receive rotary motion therefrom. A casing cover 48 is fastened to the bracket 43 as a protection from the worm gears 40 and 47 (FIG. 2). At the inward end of the shaft 46 is keyed a driving gear hub 49 to which a driving gear 50 is adjustably fastened by three bolts 51 (one shown) (FIG. 2). The bolts 51 are inserted through three concentric slots (not shown) in the hub 49 which permit timing adjustments to be made between this driving gear and the selective mechanism in their relation to the movement of filling carrier.

A driven shaft 52 is supported above the shaft 46 by bearings 53 and 54 which are also carried by the bracket 43. A gear 55 and a sprocket wheel 56 are keyed to the shaft 52 and are rotated by the gear 50. A timing chain generally designated 57 (FIG. 14) is driven by the sprocket 56 and may be supported from above by an idler sprocket 58, freely rotatable upon a vertically adjustable shaft 59, its height depending on the length of the timing chain 57.

The timing chain is an interchangeable pattern executing means having matching pairs of camming links 60 and matching pairs of connecting links 61 being interconnected with separating pins 62 and secured with cotter pins 63. The camming links 60 have an outwardly facing cam surface with a centrally located cam rise 64 or cam fall 65. In the preparation of the timing chain 57, suitable camming links are selected to conform with the extent of rise or fall required to place the selective mechanism in the desired positions as will be later explained. The positioning of the camming links 60 may be reversed which will reduce the number of link variations required and in which case, for example, the cam rise 64 would act as a cam fall. The outer edges of the individual connecting links 61 are at variable heights as measured from the sprocket 56 and serve as a cam rest surface 66. In making up a chain 57, the links 61 are chosen so that each link 61 will be equal in height to the camming surface of the link 60 immediately preceding.

Figure 14:
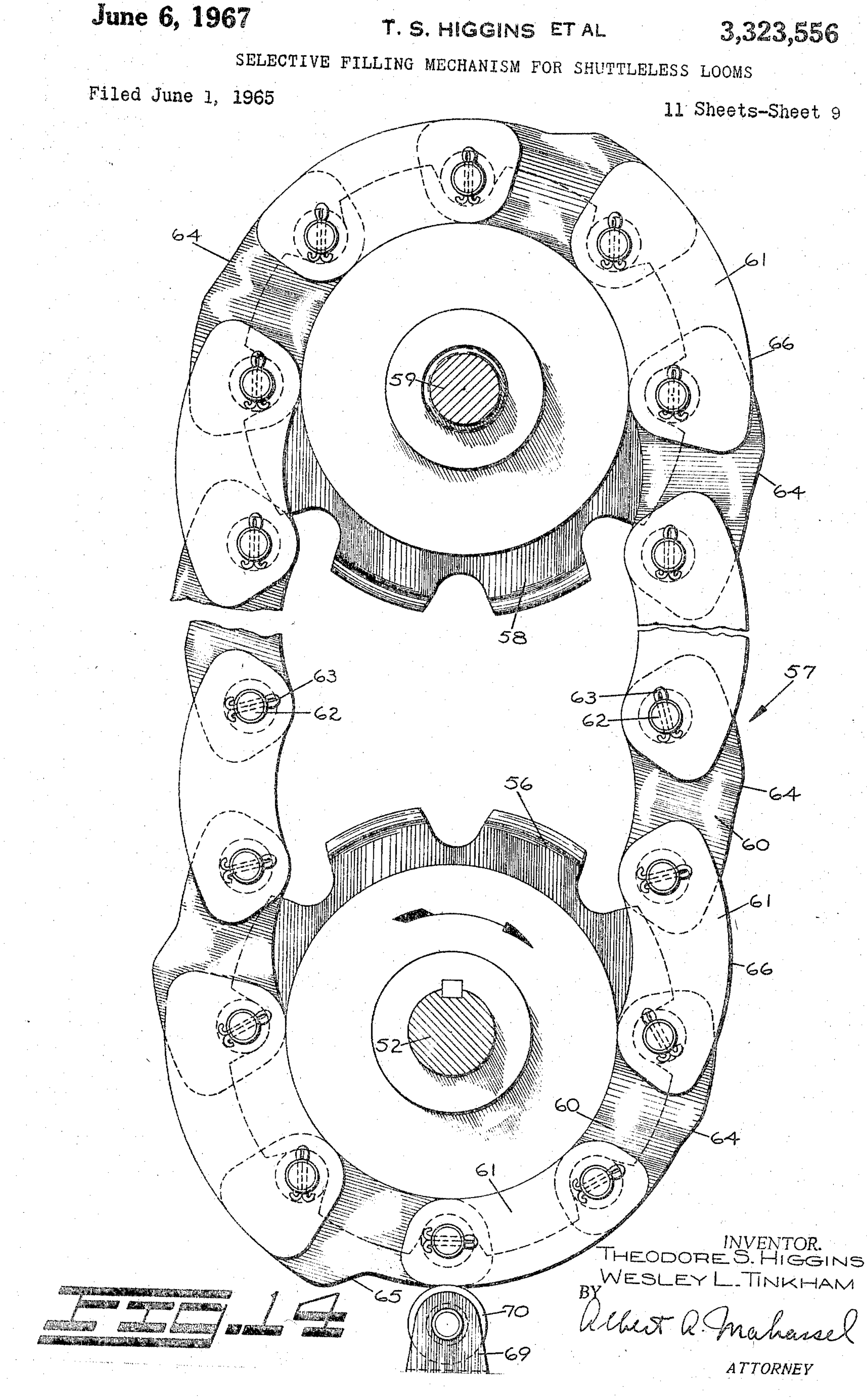
FIG. 14 is a front elevation of a preferred timing chain and sprockets, showing the camming and connecting links.

Directly below the sprocket 56 is fastened an upwardly directed hollow casing 67 in which a plunger 68 is movably held (FIG. 2). Attached to the upper end of the plunger 68 is a U-shaped member 69 through the arms of which is supported for rotation a roller cam follower 70 (FIGS. 2 and 14). The follower 70 is urged upwardly into contact with the timing chain 57 by a compression spring 71 adjustably held within the lower end of the casing 67 by an adjusting screw 72. A vertical series of teeth 73 have been cut into one side of the plunger 68 along a portion of its length to form a rack gear through which the dictates of the pattern chain may be transmitted to the filling mechanism.

A horizontally positioned shaft 74 is supported at one end in a circular section 75 of the casing 67 adjacent the rack teeth 73 (FIGS. 1 and 2). This end of the shaft 74 is machined to form gear teeth 76 suitable to mesh with the teeth 73 of the rack. The opposite end of the shaft 74 is supported in bearings held by a bracket 77 fastened to the casing 30 (FIG. 1) by fasteners such as screws 78. On the inward end of the shaft 74, as viewed from the front of the loom, is secured for oscillation therewith a gear segment 79 which is concentric with the shaft but of a considerably larger radius (FIGS. 1 and 2).

To review briefly the operation of the movable parts thus far explained, it will be apparent that the shaft 33 will rotate in response to the rotation of loom shaft 36. Shaft 33 is geared in such a way as to make a full revolution for each complete cycle of filling insertion which constitutes in this embodiment two connected picks of filling. The worm gears 40 and 47 will rotate the shaft 46 which through the gears 50 and 55 will turn the sprocket 56 and timing chain 57. The camming links 60 through the cams 64 or 65 will raise or lower plunger 68, which movement will oscillate the shaft 74 and the gear segment 79.

Rearwardly of the bracket 77 and supported for rotation in bearings held therein is a further shaft 80 having a gear 81 cut therein near its inward end. The gear 81 is positioned to be constantly in mesh with the gear segment 79 (FIGS. 1 and 2). Observation of FIG. 2 will show that a relatively small camming indication from the chain 57 will, through the rack 73 and small gear 76, result in a greatly multiplied extent of rotation to the gear 81.

The shaft 80 (FIG. 1) supports toward its outwardly directed end the rotary indexing head which comprises a friction bracket 82 and a cutter bracket 83 both generally designated and will be fully explained below. The brackets 82 and 83 are both keyed to the shaft 80 in spaced relationship forming an open area through which the filling threads will pass in traveling from bracket 82 to bracket 83. The shaft 80 extends from a side to side direction in relation to the loom and is generally parallel to and above the plane of movement of the inserting carrier (FIG. 2).

In the preferred embodiment four filling threads F from separate supplies S (FIG. 15) are drawn into and through friction bracket 82 to the inner side of the bracket 83. The threads in passing through these two brackets are each controlled in separate feeding stations which extend axially of both brackets and are spaced circumferentially in equal angular relationship. Each feeding station includes a complete identical set of yarn controlling instrumentalities and as each set functions similarly, only one will be thoroughly explained.

Figure 3:
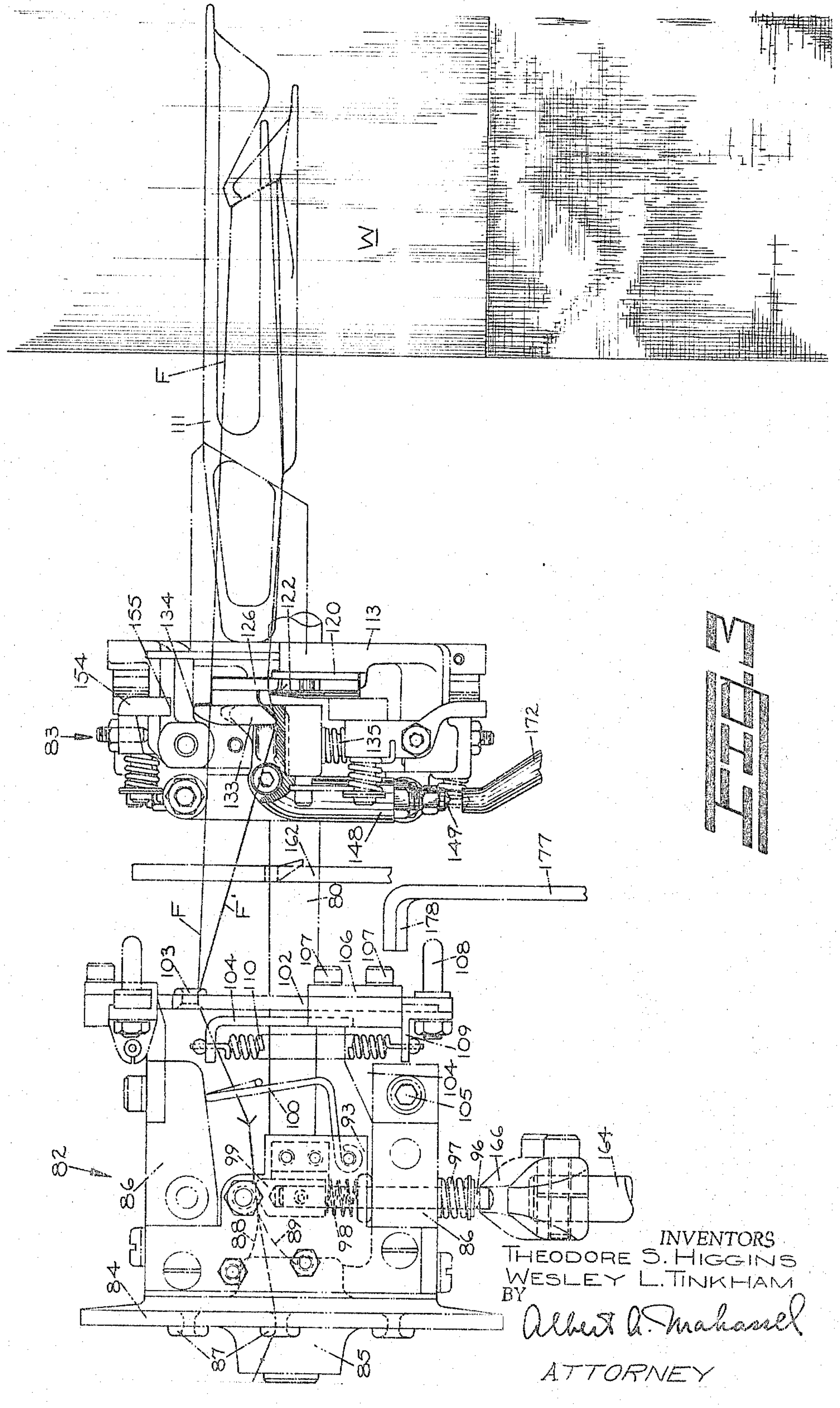
FIG. 3 is a bottom view of the rotary indexing head as the filling carrier commences the first pick.
Figure 4:
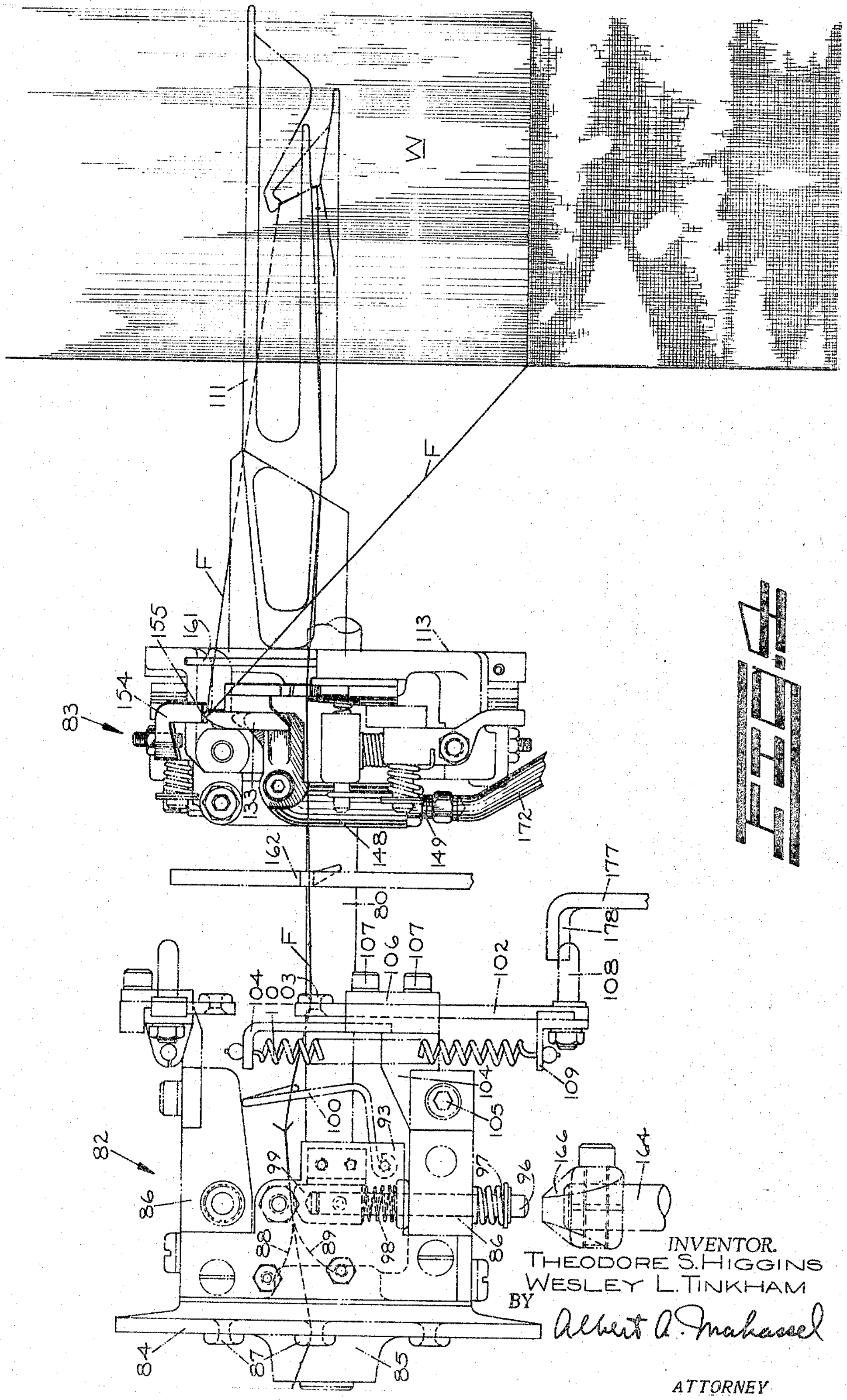
FIG. 4 is a view similar to FIG. 3 showing the carrier commencing the second pick.
Figure 5:
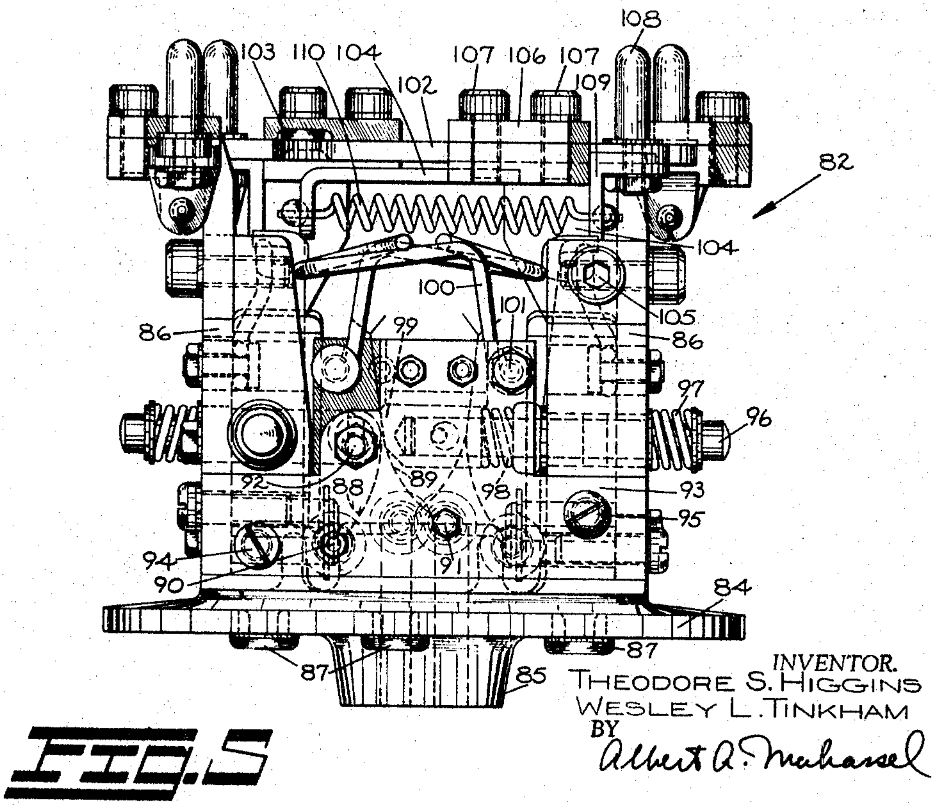
FIG. 5 is a plan view, as seen upon a loom, of the friction bracket portion of the indexing head.
Figure 15:
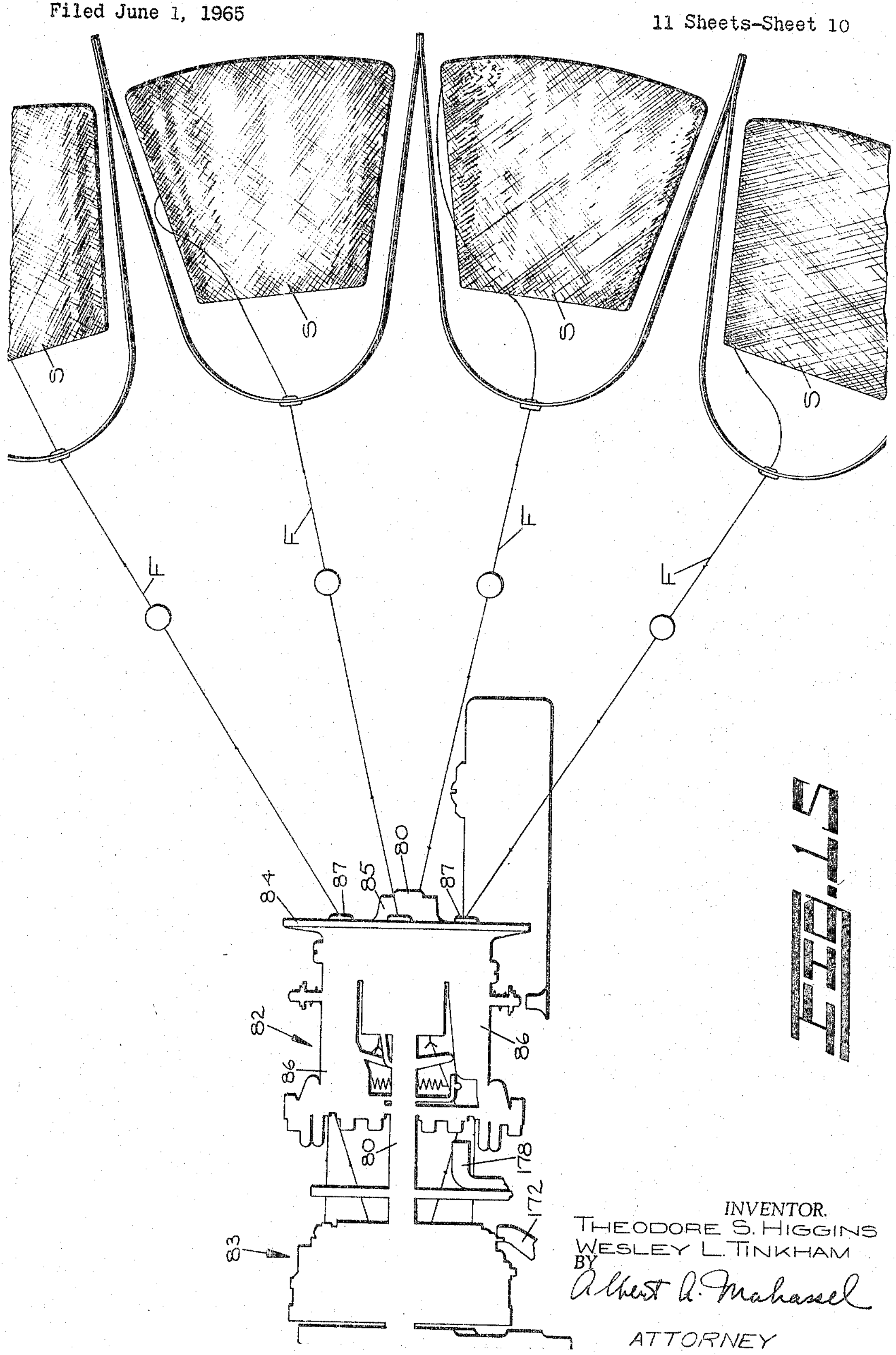
FIG. 15 is a plan view of a four-thread filling source placed externally of a loom.

The friction bracket 82 is assembled upon a face plate 84 having a hub 85 and four horizontally inwardly directed supporting arms 86 equally spaced (FIGS. 5 and 15). Four spaced holes through the plate 84 have grommets 87 of wear resistant material for receiving the filling threads from the supply. The filling is then received by a pair of thin flat spring friction plates 88 and 89 (FIG. 5) urged against each other by being turned around posts 90 and 91 and a third post 92 triangularly positioned against which the friction plates can be clamped to close off the flow of filling at specified intervals. The three posts 90, 91, and 92 are threaded and fastened through a generally T-shaped sidewall 93 which is secured between each two arms 86 by screws 94 and 95. It has been found advantageous to form the sidewall 93 of sheet Plexiglas or other transparent material for visibiltiy of the inner mechanism (FIGS. 3, 4, and 5). A shaft 96 extends through a hole in the arm 86 directed toward the plates 88 and 89 and in line with the post 92. The shaft 96 may be moved inwardly by overcoming the tension of springs 97 and 98 positioned on opposing sides of the arm 86. The inner end of the shaft 96 may have a tip 99 of a resilient material such as rubber or neoprene. The friction plates 88 and 89 exert a continual tension to the incoming yarn so that the supply does not overrun within the friction bracket. When pressure is applied to the shaft 96, the friction plates 88 and 89 are locked together and the filling is retained therebetween during a portion of the picking cycle.

A guide wire 100 supported from the sidewall 93 by a screw 101 is bent to form a loop for positioning the filling vertically as it leaves the friction plates 88 and 89 (FIGS. 3 and 5).

Figure 6:
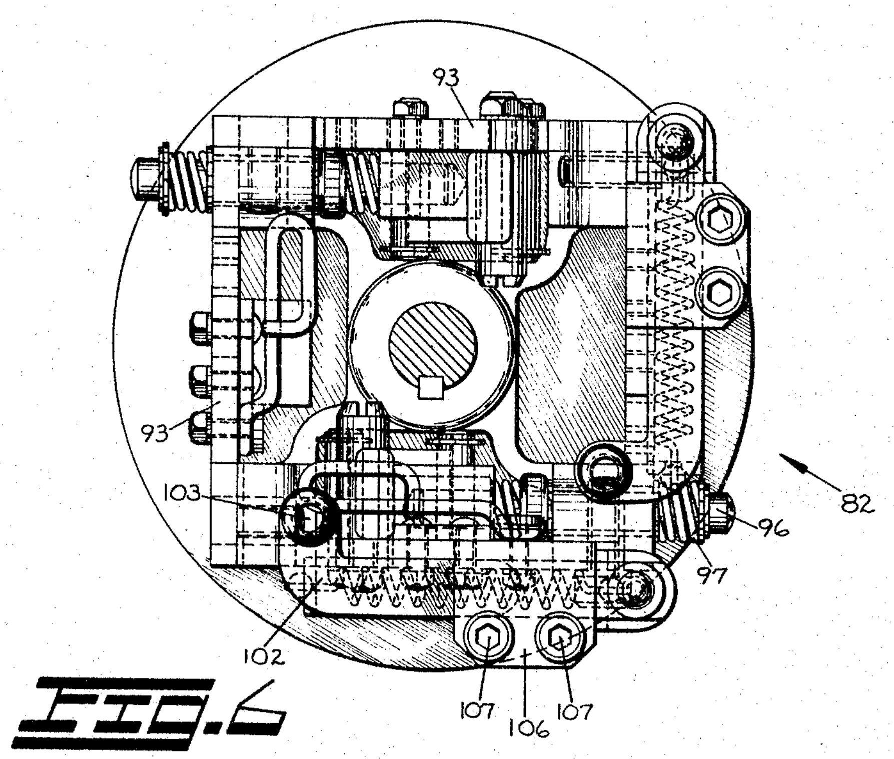
FIG. 6 is an elevation of the device in FIG. 5 as viewed from the left side of the loom.

Filling positioning is further carried out by a positioner arm 102 having an inwardly turned end for holding a positioning eyelet 103 of a wear resistant material through which the filling is threaded (FIGS. 3, 5 and 6). Arm 102 is slidably held between an angular bracket 104, secured to arm 86 by a screw 105, and a cover 106 which are held together by screws 107. Fastened through the positioner arm 102 at the end opposing the one holding the eyelet 103 are a stud 108 extending inwardly of the loom and an angular anchor 109 extending outwardly of the loom. A spring 110 is fastened under tension between the anchor 109 and the end of the bracket 104 whereby the positioner arm 102 can be moved in one direction but will be urged oppositely by the spring 110.

The filling in passing through the controlling elements of the friction bracket 82 follows a path generally parallel to the supporting shaft 80 and the filling carrier 111 as shown in FIG. 4. The positioner arm 102 is movable in a direction vertical to the shaft 80 which will change the path of movement of the filling transversely of its parallel path. The mechanism is so arranged that only the filling thread occupying the lower position, when the bracket is rotated, may be contacted by the inserting carrier. Each yarn feeding station is rotatable to this lower or feeding position and when rotated away becomes inactive. The paths of the filling are illustrated in FIGS. 3 and 4, it being understood that these figures are bottom views and only active parts are shown for clarity. In FIG. 4 the filling follows a path parallel with the shaft 80 and in FIG. 3 the arm 102 has drawn the filling transversely of the parallel path. The purpose of this transverse movement will be explained more fully below.

Figure 8:
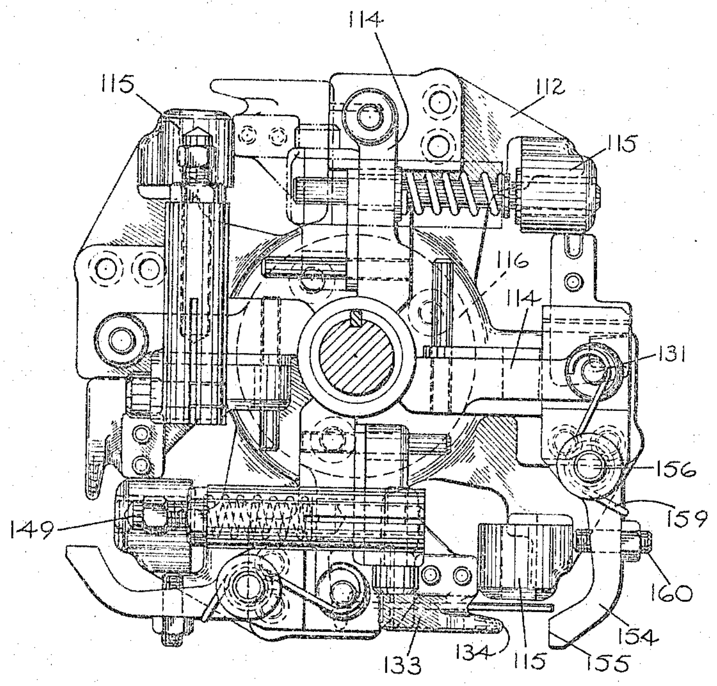
FIG. 8 is an elevation of the device in FIG. 7 as viewed from the right side of the loom.
Figure 7:
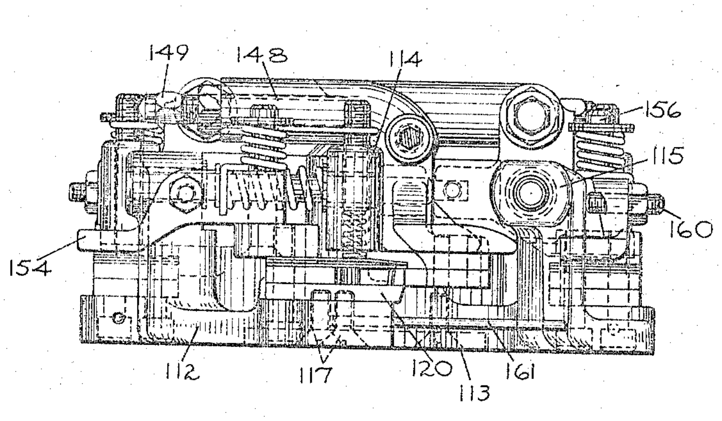
FIG. 7 is a plan view, as seen upon a loom, of the cutter bracket portion of the indexing head.
Figure 16:
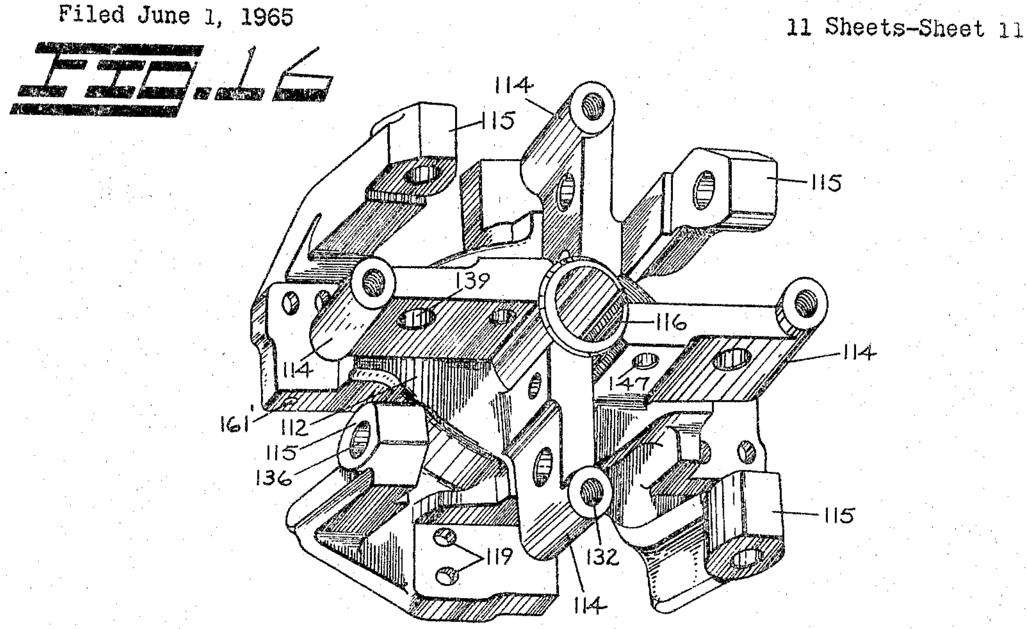
FIG. 16 is a right-hand elevation in perspective of the base of the cutter bracket shown in FIG. 8 minus the assembled filling controlling parts.

The filling passes through the eyelet 103 toward the cutter bracket 83 and the controlling instrumentalities therein. The four sets of identical controlling parts in bracket 83 are attached to a base 112 having a flat and generally round inwardly directed face 113 (FIGS. 7, 8, and 16). The base 112 is keyed for oscillation upon the shaft 80 and has four radially directed spoke members 114 and four arms 115 equally spaced about the outer periphery. All of the spoke members and arms extend outwardly of the loom or toward the friction bracket 82 (FIG. 16). The base 112 may have a hub 116 for added strength secured flush with the face 113 by means of screws 117.

Figure 17:
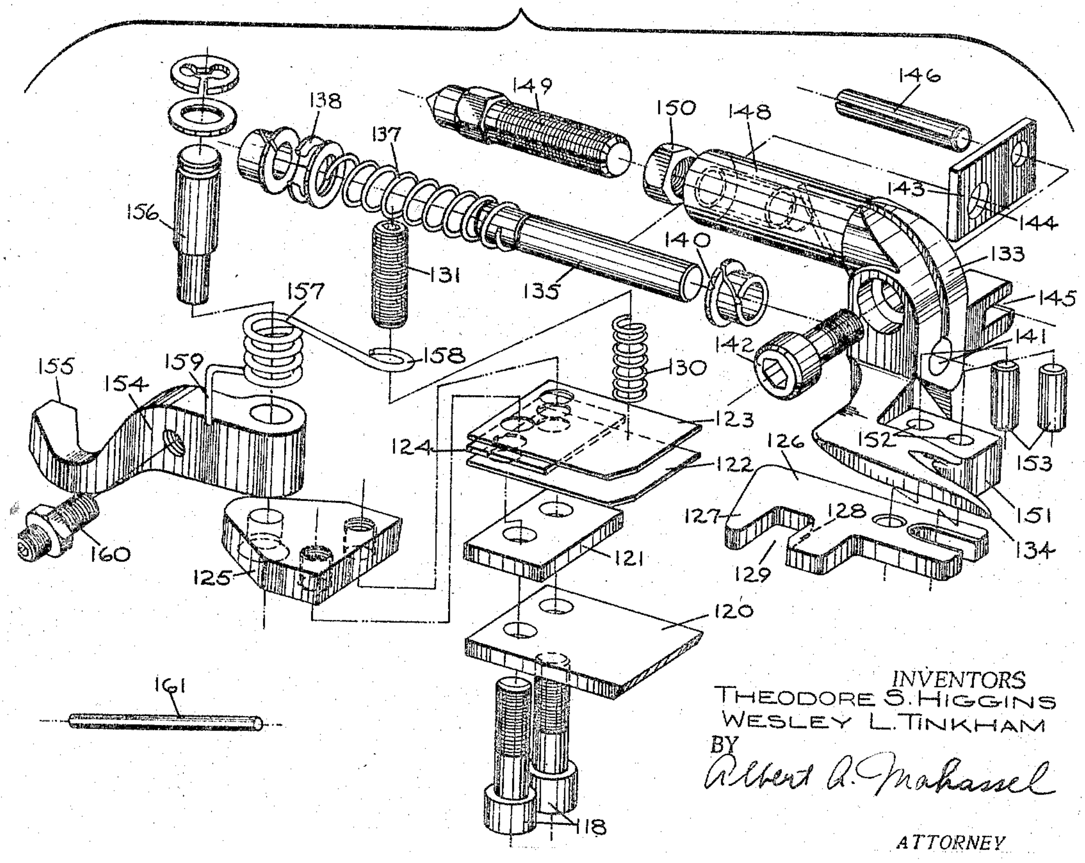
FIG. 17 is an exploded diagrammatic view of one complete set of filling controlling parts applicable to the base shown in FIG. 16.

The filling is held at the start of a two-pick cycle by a gripper-cutter mechanism, it having cut and gripped the filling at the end of the previous cycle. Refer to FIGS. 16 and 17 in connection with the explanation of a single set of controlling parts as aplied to the base 112, it being understood that four sets are to be included in spaced relationship around the base. Two threaded screws 118 are inserted through holes 119 in the base 112 and the non-moving gripper-cutter parts are assembled thereon. A cutter blade 120, a narrower separating plate 121, two flexible gripper sheets 122 and 123 with a separator 124 therebetween are securely fixed to the base 112 by the screws 118 being tightened into a clamping plate 125. A movable thread cutter 126, having a nose portion 127, a cutter shoulder 128 and a thread channel 129 between the nose and the shoulder is slidably held between the blade 120 and the sheet 122. Pressure is exerted upon the gripper sheets 122 and 123 toward the cutter 126 by a spring 130 and a threaded adjusting screw 131 inserted into the hole 132 in the spoke member 114. The sliding motion of the cutter 126 is such that only the shoulder 128 and the channel 129, but not the nose portion 127, are drawn from between the blade 120 and gripper sheet 122. This action will press a thread of filling, if positioned in the channel 129, against the blade 120 where it will be severed and also against the flexible sheets 122 and 123 where it will be gripped by the cutter surface 126. The filling when being drawn through the channel 129 will follow a path that is parallel with that of the inserting carrier (FIG. 4) which is vertically aligned with the channel 129.

The trapping of the filling for placing it in a proper position to effect the second pick of the cycle is accomplished by an angularly shaped member 133 having a smooth thread surface ending in a point 134 (FIG. 17). A shaft 135 is slidably held at one end in a hole 136 in the arm 115 against the urging of a compression spring 137 surrounding the shaft and retained thereon by a locking C-ring 138. The shaft 135 extends through a hole 139 in the spoke 114 which supports a bearing 140 and is secured in a hole 141 through the member 133 by a locking screw 142 threaded therein. A bumper 143 of resilient material is adhered to the vertical surface of the spoke member 114 to restrict the movement of the member 133 being biased by the compression spring 137. The point 134 is directed toward a second arm 115 which partially supports a second set of controlling parts. The shaft 135 passes through a hole 144 in the bumper 143. The member 133 is further restrained from rotating on the shaft 135 by a slot 145 formed in one side and having a roll pin 146 driven through the slot 145 into a hole 147 in the spoke 114. A finger 148 forms a part of the member 133 and extends generally parallel to the shaft 135 and in the direction opposite to that of the point 134. A threaded adjustable screw 149 is inserted into the end of the finger 148 and locked into position by a lock nut 150. It will be seen that by applying pressure to the point of screw 149, the member 133 will slide with the shaft 135 from that position shown in FIG. 3 to that in FIG. 4. Forming a part of the member 133 and adjacent the point 134 is a shoulder 151 having two holes 152 by which the thread cutter 126 is supported with two pins 153.

The point 134 of the member 133 is directed to and slidable toward a position offset transversely from that path followed by the inserting carrier which is vertically aligned below the cutter and gripper. The point 134 is slidable toward a filling holder lever 154 and will contact its smooth flat surface 155 with sufficient pressure to contain a loop of filling therebetween (FIGS. 4 and 17). During insertion of the first pick, filling paying out from the supply will be guided through the gap between the point 134 and surface 155 (FIG. 3). When the gap is closed to position the filling for the second pick, the point 134 will momentarily retain a loop of the pick which will extend over and under its pointed end (FIG. 4). The lever 154 is pivotally held by a pin 156 inserted into the plate 125. A tension spring 157 is coiled around the pin 156 and has one end 158 anchored to the adjusting screw 131 and the other end 159 bent to urge the flat surface 155 toward the point 134 of the adjacent set of parts (FIG. 8). An adjusting screw 160 is inserted through the lever 154 and will bear against the arm 115 under the influence of the spring 157. A filling guide wire 161 (FIGS. 7 and 9) is forced into a hole 161' (FIG. 16) in the base 112 generally parallel with the shaft 135 for positioning the feeding filling outwardly of the cutter bracket 83. In FIG. 3 it will be seen that the carrier 111 is drawing the filling F through the positioning eyelet 103 which is in an offset position so that, as the carrier advances into the warp shed W, the filling will enter the space between the point 134 and the flat surface 155. At a certain point in the cycle this space will be closed and the filling will be trapped therebetween as shown in FIG. 4.

Referring to FIG. 3, the same filling yarn is shown in two positions to ilustrate its location just prior to and just after being engaged by the carrier 111. In the first position illustrated the end of filling $F^1$ is between the gripper 122 and the cutter 126 and from there extends outwardly of the loom through the eyelet 103 and other tensioning parts to the source of supply. In the second position illustrated the end of filling still held by the gripper 122 and the cutter 126 extends under the carrier 111 thence back over the carrier where it is marked F and continues outwardly to the supply.

A filling depressor 162 (FIGS. 1 and 2) having a series of pivotal arms is positioned to function between and below the friction bracket 82 and the cutter bracket 83 in a manner understood in the weaving art and also thoroughly explainined in United States Patent 2,665,716. The depressor in the present embodiment is positioned to engage and deflect downwardly only that thread of filling presently placed in the feeding position. Movement of the depressor 162 to engage the filling is timed to occur while the inserting carrier is fully withdrawn from the warp sheld and will place the chosen filling in a position to be taken by the carrier upon its inward motion. Only the filling thread carried by the feeding station which has been rotated to the feeding position will be withdrawn from its source of supply while all other filling threads will be retained while in an inactive position.

Figure 10:
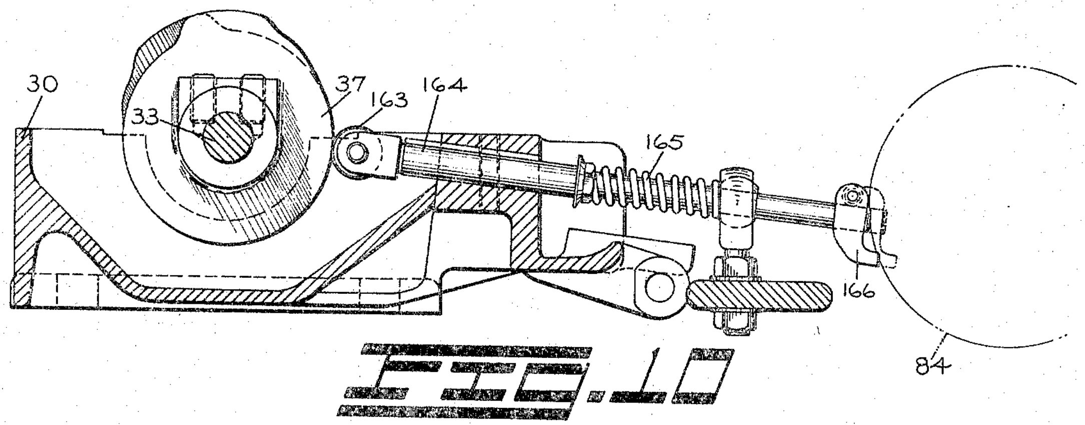
FIG. 10 is a sectional view taken on line 10—10 in FIG. 1.
Figure 7:
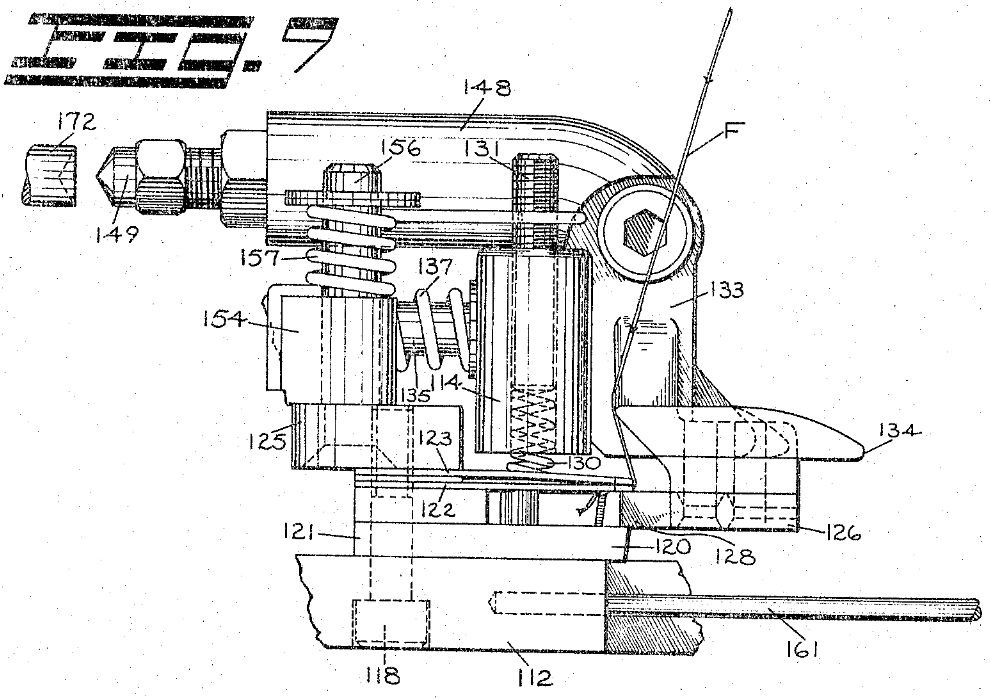
Figure 13:
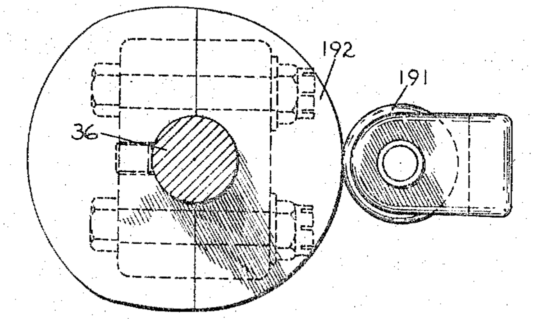
FIG. 13 is a sectional view taken on line 13—13 in FIG. 11.

Now referring to FIGS. 1 and 10, the pair of adjustable cams 37 acts against a roller follower 163 fastened to one end of a tappet 164 resiliently urged toward the cam by a compression spring 165. The tappet 164 extends rearwardly of the loom and has secured to that end a finger 166 which is directed toward and in position to contact the shaft 96 of the feeding station then in the feeding position (FIGS. 3 and 4). As was explained above, the inward movement of the shaft 96 will exert pressure to the friction plates 88 and 89 sufficient to lock the filling therebetween and to stop the supply. The cam 37 is timed so that this action takes place during the first pick of each cycle to hold back the incoming filling from the supply while the loose end is released by the gripper and drawn to the far side of the shed. It will be remembered that the shaft 33 makes one revolution during each two picks by the loom so that this locking action will only occur during the central portion of the first pick.

Cams 38 on the shaft 23 (FIG. 1) actuate the depressor 162 so that the chosen filling is deflected downwardly prior to the insertion of both picks in the known manner. The cams 38 act upon the depressor against the restraining force of two tension springs 167 and 168.

Figure 12:
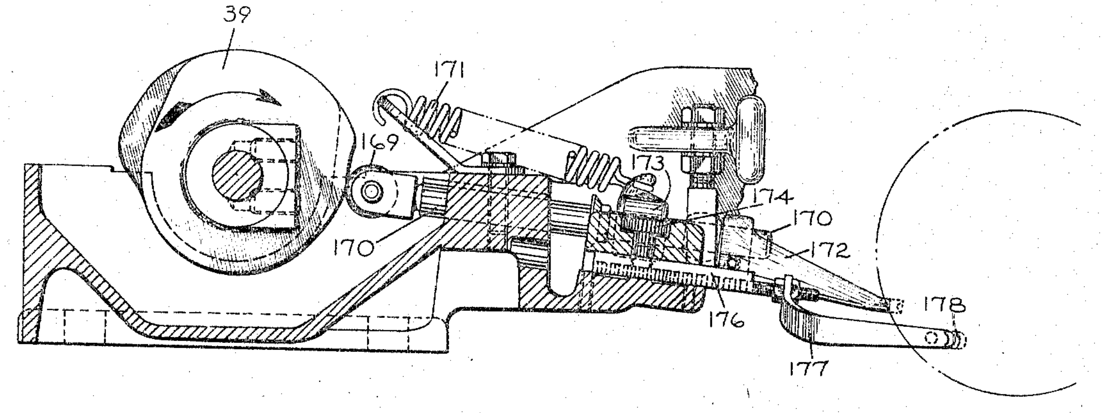
FIG. 12 is a sectional view taken on line 12—12 in FIG. 1.

The pair of cams 39 forms an adjustable cam for making a single actuation during each two-pick cycle. A roller follower 169 secured to a tappet 170 reacts to the dictates of the cams 39 against the pressure of a spring 171 (FIGS. 1 and 12). An arm 172 is fastened to the inwardly extended end of the tappet 170 and is directed toward the end of the threaded screw 149 by which the member 133, when in the feeding position, is caused to slide. The movement of arm 172 is sufficient to move the point 134 into close contact with the lever surface 155 (FIGS. 3 and 4). This will trap the filling during insertion of the first pick so that the filling will be reversely presented to the carrier for the second pick as will be further explained below. When the member 133 is moved rearwardly by the arm 172, the thread cutter 126 will move also. This will release the held end of filling to complete the first pick and will open the thread channel 129 for acceptance of the filling to form the second pick (FIGS. 3 and 4).

Fastened centrally on the tappet 170 for movement thereby is a short rack gear 173 (FIGS. 1 and 12) in mesh with a small gear 174 keyed to oscillate a considerably larger gear 175. A larger rack gear 176 meshing with the gear 175 will receive the increased forward and back motion initiated by the rack 173 and will move in the opposite direction to that of rack 173. Mounted on the rearward end of the rack 176 is a curved arm member 177 having an outwardly directed hook 178 by which a stud 108 will be drawn forwardly in timed relationship with the rearward motion of the member 133. When the tappet 170 (FIG. 1) responds to the cams 39, the arm 172 will move the member 133 rearwardly and the hook 178 will draw the stud 108 forwardly.

The instant invention discloses a novel selective filling mechanism for high-speed shuttleless looms of the type where reciprocating flexible carrying members insert connected picks of filling drawn from a stationary outside source of supply. A plurality of varied filling threads are controlled and presented individually and in a predetermined sequence to the inserting carrier. By means of a prepared timing chain, having camming links, a rotary head is made to oscillate to place selected yarn feeding stations into a position for feeding a selected filling yarn. With the preferred embodiment herein a selection may be made from any of four filling stations as often as is desired following any number of two-pick cycles.

The operation of the filling controlling instrumentalities during insertion of a chosen yarn during a single two-pick cycle will now be explained. At the start (FIG. 3) of a cycle the filling extends from the stationary outside supply through the face plate 84, the friction plates 88 and 89, the guide wire 100 and the positioning eyelet 103, under the downwardly moving depressor 162 to the gripper 122 and cutter 126 where the end is securely held. The depressor 162 draws the filling downwardly in a V shaped loop having one upwardly directed leg extending toward the source of supply and the other leg extending to and held by the cutter bracket 83. The positioning eyelet 103 is transversely offset from a position vertically aligned with the path of the filling carrier 111. As the carrier commences its inward stroke, it engages one leg of the vertically held loop of filling formed by the depressor. Due to the offset position of the eyelet 103 the leg of filling which extends outwardly to the stationary outside supply is the one engaged by the carrier. In this case the filling from the supply will feed along the top of the carrier while the held end will extend below. A reversal of this vertical presentation of filling to the carrier occurs during the second pick whereby the loop formed by the depressor is such that the vertical leg extending toward the cloth is engaged by the carrier. In this second case the filling from the supply will feed along the bottom of the carrier while the held end will extend along its top. By reversing the manner of presenting the filling to the carrier, the cut end which will extend to the far side of the cloth is always drawn from beneath the inserting carrier and the tension is more evenly controlled.

As the carrier continues into the warp shed, the filling being drawn from the supply will thread into the opening between the point 134 and the lever 154 (FIG. 3). Just prior to the transfer of the filling to an extending carrier at mid-warp the held end of filling is released from the gripper 122. At the moment of transfer the filling supply is stopped by the friction plates 88 and 89 so that only the released end is available to finish out the pick and its length is thereby controlled. Immediately after transfer the gripper 122 and cutter 126 have fully opened and the point 134 has trapped the filling between the lever 154. As the extending carrier drops the completed pick, the friction plates 88 and 89 are released, the depressor 162 starts forming a second vertical loop, and the loom lay beats up to complete the first pick.

The carrier engages the vertically held leg of filling for the second pick as previously explained, aided by the fact that the positioning eyelet 103 had moved to a vertically aligned position when the cutter 126 was fully opened. As the carrier enters the shed the filling feeds through the open cutter (FIG. 4). The point 134 is retracted somewhat in order that the loop of filling held thereby may be released and drawn into the shed. As the transfer is made the cutter 126 is fully engaged thereby severing and releasing the filling being drawn into the warp and holding that end which extends back to the supply. As soon as the severed end has been drawn fully across the shed and the lay has beaten up to the fell, the depressor 162 starts its downward drawing motion in preparation for the next cycle. This completes the second pick of the full cycle.

During a small period of time in the second pick, after the full engagement of the cutter and before the movement of the depressor, the rotary head may be indexed selectively following a predetermined pattern. The four feeding stations are equally spaced around the rotary head so that to place any one station into the feeding position it is only necessary to oscillate the head through an arc of 270° with indexing spaced in 90° intervals. This oscillation is accomplished through the gearing explained above and initiated by the timing chain 57 (FIG. 14). In preparing a chain for a pattern requiring up to four filling threads a choice of camming links 60 is made to insure the proper cam height to position the filling desired. Cam height in this description refers to the radial distance between where the camming link is in contact with the sprocket periphery and the outer surface of the link following a cam rise or fall. The cam height will determine the point to which the head will be rotated by the gear segment 79 (FIG. 2) and this point will be maintained by a pair of connecting links 61 having a similar height. In a rotary head with four feeding stations as herein disclosed there would be twelve change opportunities but by using reversible camming links 60 only six different height combinations are required, together with four different connecting links. Where there is a long repeat of a particular filling a multiplier mechanism can be used in conjunction to reduce the chain length.

Figure 11:
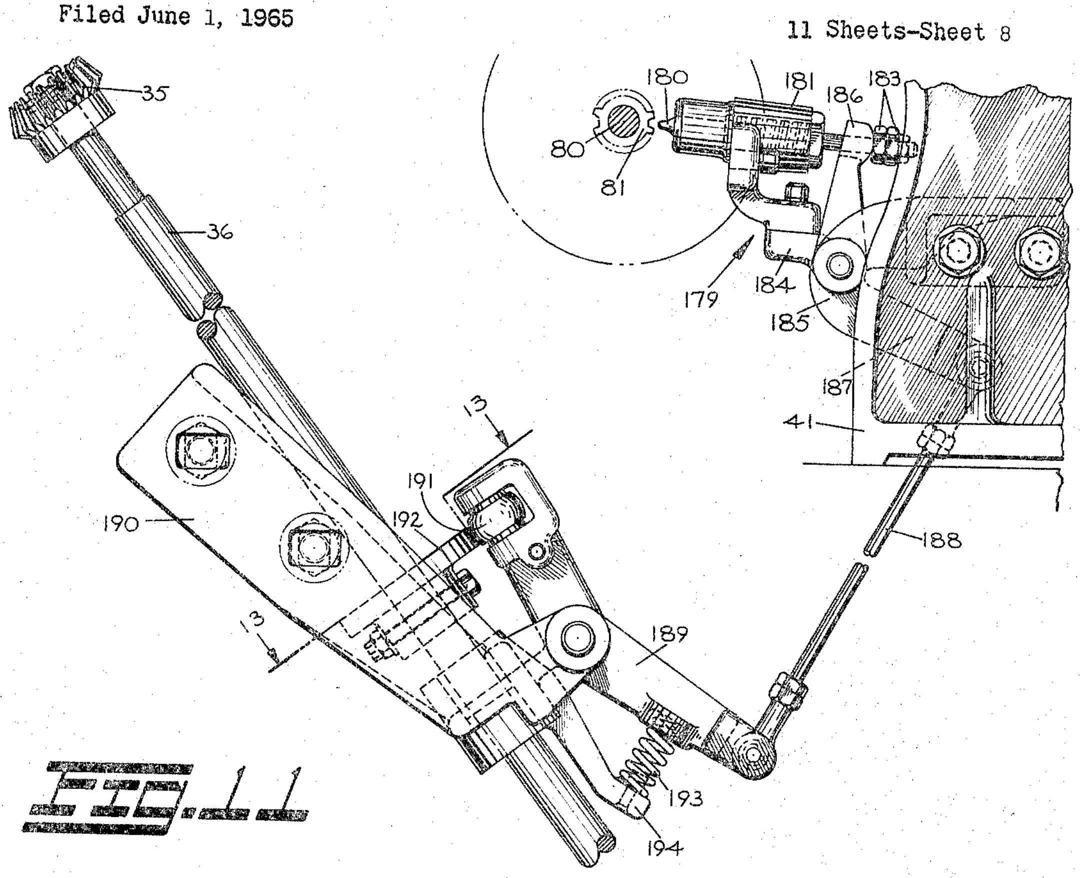
FIG. 11 is a diagrammatic view of the actuating parts for the locking device shown in FIG. 2.

After the rotary head has been indexed to where the desired feeding station is in the feeding position, it has been found advantageous to lock the head in place to ensure the accuracy of the position and the stability of the mechanism. Referring to FIGS. 1, 2, and 11, a locking device generally designated 179 is shown in its relationship with the gear 81 and the shaft 80 by which the rotary head is rotated and supported. A plunger 180 is positioned to be inserted between two teeth of the gear 81 as a lock to prevent rotation. The plunger 180 is slidably held by a sleeve 181 having an internal compression spring 182 urging the plunger toward the gear. The rearward end of the plunger 180 is threaded and contains two lock nuts 183. The sleeve 181 is fixedly supported by a bracket 184 secured to the loom at 41. A bell crank lever 185, pivotally mounted on the bracket 184, has one arm notched as at 186 to receive the rearward portion of the plunger 180. The notched portion 186 will bear against the lock nuts 183 and draw the plunger 180 away from the gear 81 against the urging of the spring 182 when the bell crank is pivoted. The second arm 187 of the bell crank 185 is coupled by a connecting rod 188 to a second bell crank lever 189 which is pivotally fixed to a portion of the loom side framework 190. A cam follower roller 191 is supported for free rotation upon the end of the bell crank lever 189. The cam follower 191 is urged into continuous contact with a cam 192 fastened to rotate with the downwardly extending shaft 36 by a compression spring 193 which is supported on an arm 194 attached to the framework 190 (FIG. 11).

This locking device 179 is timed to release prior to an indexing indication by the pattern chain and the release is performed by positive mechanical leverage instituted by the cam 192. When the rotary head has indexed to the chosen position, the cam 192 allows the follower 191 to fall sufficiently to pivot the notched arm 186 away from the lock nuts 183. The spring 182 will then seat the plunger 180 into the teeth of the gear 81 thereby locking the head at the chosen position.

While one embodiment of the invention has been disclosed, it is to be understood that the inventive concept may be carried out in a number of ways. This invention is, therefore, not to be limited to the precise details described, but is intended to embrace all variations and modifications thereof falling within the spirit of the invention and the scope of the claims.

We claim:

1. In a shuttleless loom having filling inserting means for drawing and inserting filling from an external source of supply, a rotary indexing head for presenting a plurality of filling threads individually to the inserting means which comprises:
   (a) a plurality of yarn feeding stations mounted in spaced circumferential relationship within said indexing head,
   (b) said indexing head being supported for oscillation upon a shaft extending generally parallel to the plane of movement of the inserting means,
   (c) each one of said feeding stations being selectively movable between inactive positions and a yarn feeding position, and
   (d) each one of said feeding stations including the combination of instrumentalities for tensioning, positioning, trapping, gripping and cutting the filling during its passage through said stations.

2. In a loom having means for inserting connected picks of filling from an external source of supply to form a fabric and adapted to present that filling to the inserting means in a generally vertical relationship and reversely at successive picks, a filling motion for a plurality of threads of filling to be engaged by the inserting means which comprises:
   (a) a rotary indexing head for presenting each one of said filling threads singly to said inserting means,
   (b) a plurality of yarn feeding stations mounted in spaced circumferential relationship within said indexing head,
   (c) a shaft supporting said indexing head for oscillation thereon extending generally parallel to the plane of movement of said inserting means,
   (d) each one of said feeding stations being selectively movable between inactive positions and a yarn feeding position, and
   (e) yarn controlling instrumentalities separately contained in each one of said feeding stations being arranged to release the filling for insertion when rotated to the yarn feeding position and to restrain the filling when moved to an inactive position.

3. Mechanism as defined in claim 2 wherein said yarn controlling instrumentalities include:
   (a) means for retaining the filling adjacent the supply,
   (b) a cutting and gripping means for the filling between the said retaining means and the fabric, and
   (c) a trap adjacent said cutting and gripping means for controlling the filling when said trap is moved to a closed position.

4. Mechanism as defined in claim 3 wherein said trap when moved to the feeding position is offset, with respect to the cutting and gripping means, laterally of the normal direction of movement of filling from the supply toward the fabric.

5. In a loom having means for inserting connected picks of filling from an external source of supply to form a fabric and adapted to present that filling to the inserting means in a generally vertical relationship and reversely at successive picks, the combination of a filling inserting member and a filling motion for presenting a plurality of threads of filling, means for engaging one of said threads of filling and deflecting it to a position to be received by the said inserting member, said filling motion comprising:

(a) a rotary indexing head for presenting each one of said filling threads singly to said inserting means,
(b) a plurality of yarn feeding stations mounted in spaced circumferential relationship within said indexing head,
(c) a shaft supporting said indexing head for oscillation thereon extending generally parallel to the plane of movement of said inserting means,
(d) each one of said feeding stations being selectively movable between inactive positions and a yarn feeding position, and
(e) each one of said feeding stations having means for controlling the filling including the combination of instrumentalities for tensioning, positioning, trapping, gripping and cutting the filling during its passage through said stations.

6. Mechanism as defined in claim 5 wherein said instrumentalities for controlling the filling comprise a retaining member adjacent the source of filling supply, a cutter and gripper between said retaining member and the fabric, a trap adjacent said cutter and gripper and offset therefrom, a filling positioning eyelet for moving the filling to be engaged by the inserting means, and means for actuating the said filling controlling means in timed relationship to the movements of the inserting means.

7. Mechanism as defined in claim 6 wherein said actuating means comprises:

(a) a cam shaft,
(b) a plurality of adjustable cams fixed to said shaft,
(c) means for rotating said shaft in timed relationship to the movement of said inserting means,
(d) a plurality of cam followers, one for each one of said adjustable cams, and
(e) each one of said cam followers being interconnected for transmitting motion from its cam to one of said filling controlling instrumentalities.

8. In a filling motion for looms having a filling inserting carrier functioning to insert connected picks of filling from an external source of supply to form a fabric and adapted to present that filling to the inserting carrier in a generally vertical relationship and reversely at successive picks, means for presenting a plurality of threads of filling individually to said inserting carrier which comprises:

(a) a rotary indexing head having a plurality of yarn feeding stations mounted in spaced circumferential relationship therein,
(b) a shaft supporting said indexing head for oscillation thereon extending generally parallel to the plane of movement of said inserting carrier,
(c) means for moving said indexing head selectively to transport each one of said yarn feeding stations from inactive positions to a yarn feeding position,
(d) said yarn feeding stations each including individual sets of yarn controlling instrumentalities,
(e) each one of said sets including a retaining member adjacent the source of filling supply, a cutter and gripper between the retaining member and the fabric, a member for trapping filling adjacent said cutter and gripper and offset therefrom relative to the plane of movement of said carrier, and a filling positioning eyelet for moving the filling to be engaged by the inserting carrier,
(f) a filling depressor movable to a filling engaging position in timed relationship to the movements of the inserting carrier for moving the filling downwardly into the path of the carrier from the particular feeding station which may be in the yarn feeding position, and
(g) means for moving the filling positioning eyelet to and from substantially vertically aligned and offset positions with respect to the plane of movement of said carrier, whereby the filling extending outwardly to the supply will be engaged by the carrier so as to feed over the top of the carrier on one pick and beneath the carrier on the subsequent pick.

9. Mechanism as defined in claim 8 wherein said means for moving said indexing head selectively comprises:

(a) a driving means functioning in accord with the said inserting carrier,
(b) a driven interchangeable pattern executing means for relaying movements indicated by a preselected pattern, and
(c) a pattern transmitting means being responsive to said executing means by oscillating said indexing head and placing selected yarn feeding stations into said yarn feeding position.

10. Mechanism as defined in claim 9 wherein said driving means is provided with adjusting means for timing the movements of the indexing head to coincide with the inserting carrier.

11. Mechanism as defined in claim 9 wherein said pattern executing means comprises a sprocket, a timing chain rotated by said sprocket having camming links for effecting a varying extent of movement to said transmitting means.

12. Mechanism as defined in claim 11 wherein said timing chain also includes connecting links having a cam-rest camming surface for holding said transmitting means at the extent of movement effected by said camming links.

13. Mechanism as defined in claim 9 wherein said transmitting means comprises a train of gears for oscillating said indexing head, said gears being adapted to multiply the extent of movement received from said executing means, and resilient means for urging said transmitting means into pressure contact with said executing means.

14. Mechanism as defined in claim 13 wherein said train of gears includes a rack in mesh with one end of a reciprocating shaft formed as a spur gear, a gear segment having a greater radius than said reciprocating shaft and pinned to oscillate therewith, a further gear held in mesh with said gear segment for oscillating said shaft for supporting said indexing head.

15. Mechanism as defined in claim 9 which further comprises a locking device for securing said indexing head at selected yarn feeding positions, said locking device being timed to release prior to an indication for movement by said pattern executing means.

16. Mechanism as defined in claim 15 wherein said locking device comprises a driving means functioning in timed relationship with said inserting carrier, said driving means causing said locking device to pass through a continuing cycle including a locking phase and a releasing phase, said releasing phase being effected by positive mechanical action.

17. Mechanism as defined in claim 16 wherein said locking phase is induced by compressive spring action.

18. A rotary indexing head for a shuttleless loom filling motion which contains a plurality of yarn feeding stations through each of which a strand of filling may be selectively drawn for weaving, said indexing head comprising a friction bracket and a cutter bracket, a shaft fixedly supporting said friction and cutter brackets in spaced separation for reciprocal rotation, said yarn feeding stations extending axially through said friction bracket and said cutter bracket and mounted in spaced circumferential relationship therein, said indexing head being movable selectively for moving each one of said yarn feeding stations to and from a yarn feeding position, a set of filling controlling instrumentalities being separately contained in each one of said yarn feeding stations which comprises a filling retaining means and a filling positioning means, both of said means being supported for actuation in said friction bracket, a filling cutter and gripper slidably fastened within said cutter bracket, and a filling trapping member movably supported in said cutter bracket and offset from said cutter and gripper relative to said shaft.

19. Mechanism as defined in claim 18 wherein said filling positioning means includes a positioning eyelet through which the filling is threaded, said positioning means being slidably movable in a direction normal to the said supporting shaft whereby the path of movement of the filling through one of the said feeding stations may be changed transversely.

References Cited

UNITED STATES PATENTS

| | | | |
|---|---|---|---|
| 400,260 | 3/1889 | Skinner et al. | 139—122 |
| 2,604,124 | 7/1952 | Budzyna et al. | 139—127 |
| 2,654,399 | 10/1953 | Berry et al. | 139—127 |
| 2,817,367 | 12/1957 | Pfarrwaller | 139—122 |

FOREIGN PATENTS

| | | |
|---|---|---|
| 1,348,241 | 11/1963 | France. |

ROBERT R. MACKEY, *Acting Primary Examiner.*

MERVIN STEIN, *Examiner.*

H. S. JAUDON, *Assistant Examiner.*